US012561710B2

(12) United States Patent
Krishna et al.

(10) Patent No.: US 12,561,710 B2
(45) Date of Patent: Feb. 24, 2026

(54) METHODS AND SYSTEMS FOR DETERMINING PERSONALIZED MEDIA AND TARGETED GAMING APPLICATIONS

(71) Applicant: Wayne Fueling Systems LLC, Austin, TX (US)

(72) Inventors: Anand Krishna, Bangalore (IN); Sangamesh Gundappa, Karnataka (IN)

(73) Assignee: Wayne Fueling Systems LLC, Austin, TX (US)

( * ) Notice: Subject to any disclaimer, the term of this patent is extended or adjusted under 35 U.S.C. 154(b) by 106 days.

(21) Appl. No.: 17/937,699

(22) Filed: Oct. 3, 2022

(65) Prior Publication Data

US 2023/0103538 A1 Apr. 6, 2023

(30) Foreign Application Priority Data

Oct. 4, 2021 (IN) .............................. 202111045158

(51) Int. Cl.
*G06Q 30/0207* (2023.01)
*B67D 7/04* (2010.01)
*G06Q 50/06* (2012.01)

(52) U.S. Cl.
CPC ....... *G06Q 30/0209* (2013.01); *B67D 7/0401* (2013.01); *B67D 2007/0442* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 5,890,718 A | * | 4/1999 | Byon | ...................... G07F 13/00 |
| | | | | 273/459 |
| 8,734,239 B2 | | 5/2014 | Kelly et al. | |
| 10,577,237 B2 | | 3/2020 | Fieglein | |
| 2002/0145039 A1 | * | 10/2002 | Carroll | ................ G07F 17/3255 |
| | | | | 235/384 |
| 2003/0075600 A1 | * | 4/2003 | Struthers | .................. B67D 7/14 |
| | | | | 235/381 |
| 2007/0174123 A1 | * | 7/2007 | Dorr | .................. G06Q 30/0238 |
| | | | | 705/14.36 |
| 2012/0047007 A1 | * | 2/2012 | Halsey | ................. G06Q 20/352 |
| | | | | 705/14.15 |

(Continued)

OTHER PUBLICATIONS

International Search Report And Written Opinion For Application No. PCT/US2022/077472 Mailed on Dec. 6, 2022, 9 pages.

*Primary Examiner* — Mathew Syrowik
(74) *Attorney, Agent, or Firm* — Mintz, Levin, Cohn, Ferris, Glovsky and Popeo, P.C.

(57) ABSTRACT

First data characterizing an attribute of a fuel dispenser user interacting with a fuel dispenser having an interactive display can be received. Second data characterizing a gaming application for presentation on the interactive display of the fuel dispenser can be determined based on the received first data and using a first predictive model that predicts an association of the gaming application with the fuel dispenser user characterized by the first data. The second data can be provided such that an instance of the gaming application is presented on the interactive display of the fuel dispenser. Related apparatus, systems, methods, techniques, and articles are also described.

16 Claims, 5 Drawing Sheets

300

230

210

(56)  References Cited

U.S. PATENT DOCUMENTS

| | | | |
|---|---|---|---|
| 2013/0006776 A1* | 1/2013 | Miller ................ | G06Q 20/3276 |
| | | | 705/44 |
| 2013/0165219 A1* | 6/2013 | Kelly ..................... | G07F 17/32 |
| | | | 463/27 |
| 2015/0041019 A1* | 2/2015 | Wilson ................... | A63F 13/50 |
| | | | 141/98 |
| 2015/0106196 A1* | 4/2015 | Williams ........... | G06Q 30/0253 |
| | | | 705/14.51 |
| 2017/0106283 A1* | 4/2017 | Malyuk .................. | A63F 13/49 |
| 2017/0308964 A1* | 10/2017 | Morris ..................... | B67D 7/14 |
| 2017/0355588 A1* | 12/2017 | Fieglein ................ | G06Q 20/20 |
| 2018/0101827 A1* | 4/2018 | Cage .................. | G07F 17/3218 |
| 2018/0293834 A1* | 10/2018 | Cage ....................... | H04W 4/02 |
| 2019/0213692 A1* | 7/2019 | Morris .................. | G06V 40/28 |
| 2021/0133791 A1* | 5/2021 | Stasaski ............. | G07F 17/3255 |

* cited by examiner

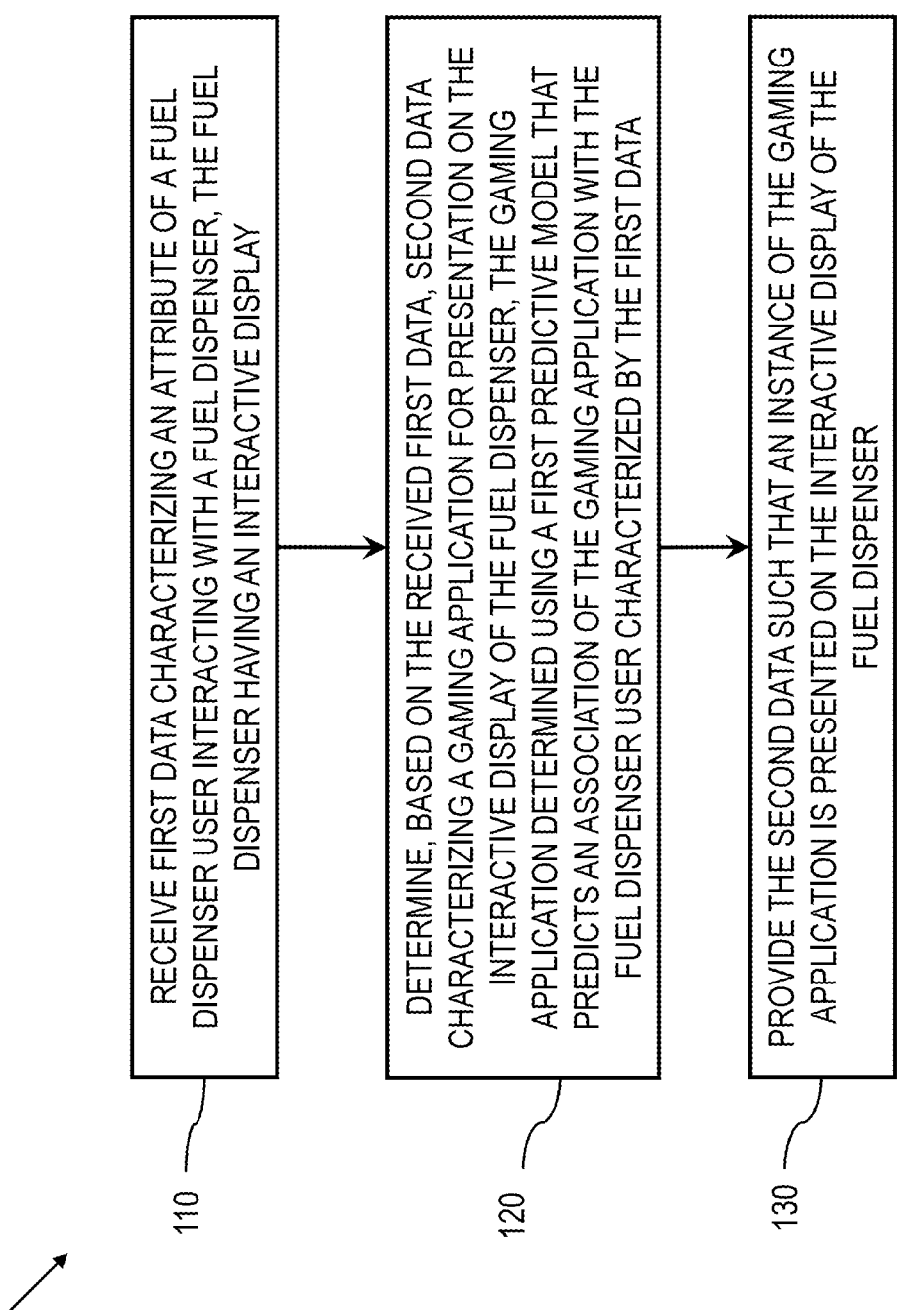

RECEIVE FIRST DATA CHARACTERIZING AN ATTRIBUTE OF A FUEL DISPENSER USER INTERACTING WITH A FUEL DISPENSER, THE FUEL DISPENSER HAVING AN INTERACTIVE DISPLAY

DETERMINE, BASED ON THE RECEIVED FIRST DATA, SECOND DATA CHARACTERIZING A GAMING APPLICATION FOR PRESENTATION ON THE INTERACTIVE DISPLAY OF THE FUEL DISPENSER, THE GAMING APPLICATION DETERMINED USING A FIRST PREDICTIVE MODEL THAT PREDICTS AN ASSOCIATION OF THE GAMING APPLICATION WITH THE FUEL DISPENSER USER CHARACTERIZED BY THE FIRST DATA

PROVIDE THE SECOND DATA SUCH THAT AN INSTANCE OF THE GAMING APPLICATION IS PRESENTED ON THE INTERACTIVE DISPLAY OF THE FUEL DISPENSER

METHODS AND SYSTEMS FOR DETERMINING PERSONALIZED MEDIA AND TARGETED GAMING APPLICATIONS

CROSS-REFERENCE TO RELATED APPLICATIONS

This present application claims priority to Indian Provisional Application No. 202111045158, entitled "METHODS AND SYSTEMS FOR DETERMINING PERSONALIZED MEDIA," and filed on Oct. 4, 2021. The entire contents of which are hereby expressly incorporated by reference herein.

FIELD

The current subject matter relates to methods and systems for determining personalized media and targeted gaming applications.

BACKGROUND

Some current fueling environments rely on traditional modes of media delivery, such as signage, flyers, posters, and social media to attract customers. It is difficult to deliver media pertaining to secondary products and services available at fueling stations, such as convenience store sales and on-site car washes, to customers at fueling stations that are solely purchasing fuel. In addition, during fueling, a fuel dispenser user may be idle and forced to spend time waiting for the completion of the fuel dispensing transaction without being meaningfully occupied by an activity during the fuel dispensing transaction and/or without engaging with the secondary products and services offered at fueling stations.

SUMMARY

Methods and systems for determining personalized media and targeted gaming applications are provided. Related apparatus, systems, techniques, and articles are also described.

In one aspect, first data characterizing an attribute of a fuel dispenser user interacting with a fuel dispenser having an interactive display can be received. Second data characterizing a gaming application for presentation on the interactive display of the fuel dispenser can be determined based on the received first data and using a first predictive model that predicts an association of the gaming application with the fuel dispenser user characterized by the first data. The second data can be provided such that an instance of the gaming application is presented on the interactive display of the fuel dispenser.

One or more of the following features can be included in any feasible combination. For example, third data characterizing an interaction of the fuel dispenser user with the instance of the gaming application can be received, fourth data characterizing a personalized communication can be determined based on the received third data and the received first data and using a second predictive model that predicts an association of the personalized communication with the fuel dispenser user characterized by the first data and with the third data, and the fourth data can be provided such that the personalized communication is presented on the interactive display of the fuel dispenser. For example, the second data can be provided to a mobile device of the fuel dispenser user such that the gaming application is presented on a display of the mobile device, and the fourth data can be provided to the mobile device such that the personalized communication is presented on the display of the mobile device. For example, the attribute of the fuel dispenser user characterized by the first data can include one or more of: an identity of the fuel dispenser user, a demographic of the fuel dispenser user, a location of the fuel dispenser, a date and time during which the fuel dispenser user is interacting with the fuel dispenser, weather conditions at the fuel dispenser during a fueling transaction, fueling preferences of the fuel dispenser user, and a history of purchases at a fueling station made by the fuel dispenser user. For example, the second data can include an instruction to cause the fuel dispenser to present a graphical icon characterizing the gaming application on the interactive display of the fuel dispenser for selection by the fuel dispenser user. For example, the third data can include one or more of: a gaming outcome of the instance of the gaming application, a gaming level of the instance of the gaming application, and a game difficulty of the instance of the gaming application. For example, an incentive can be determined using the second predictive model and based on the third data, and the personalized communication can include graphical media characterizing the incentive.

In another aspect, a system is provided and can include at least one data processor and memory storing instructions configured to cause the at least one data processor to perform operations described herein. The operations can include receiving first data characterizing an attribute of a fuel dispenser user interacting with a fuel dispenser, the fuel dispenser having an interactive display; determining, based on the received first data, second data characterizing a gaming application for presentation on the interactive display of the fuel dispenser, the second data determined using a first predictive model that predicts an association of the gaming application with the fuel dispenser user characterized by the first data; and providing the second data such that an instance of the gaming application is presented on the interactive display of the fuel dispenser.

One or more of the following features can be included in any feasible combination. For example, the operations can further include receiving third data characterizing an interaction of the fuel dispenser user with the instance of the gaming application; determining, based on the received third data and the received first data, fourth data characterizing a personalized communication, the personalized communication determined using a second predictive model that predicts an association of the personalized communication with the fuel dispenser user characterized by the first data and with the third data; and providing the fourth data such that the personalized communication is presented on the interactive display of the fuel dispenser. For example, the operations can further comprise providing the second data to a mobile device of the fuel dispenser user such that the gaming application is presented on a display of the mobile device; and providing the fourth data to the mobile device such that the personalized communication is presented on the display of the mobile device. For example, the attribute of the fuel dispenser user characterized by the first data can include one or more of: an identity of the fuel dispenser user, a demographic of the fuel dispenser user, a location of the fuel dispenser, a date and time during which the fuel dispenser user is interacting with the fuel dispenser, weather conditions at the fuel dispenser during a fueling transaction, fueling preferences of the fuel dispenser user, and a history of purchases at a fueling station made by the fuel dispenser user. For example, the second data includes an instruction to cause the fuel dispenser to present a graphical icon characterizing the gaming application on the interactive display of the fuel dispenser for selection by the fuel dispenser user. For example, the third data can include one or more of: a gaming outcome of the instance of the gaming application, a gaming level of the instance of the gaming application, and a game difficulty of the instance of the gaming application. For example, the operations can further include determining, using the second predictive model and based on the third data, an incentive, and wherein the personalized communication includes graphical media characterizing the incentive.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 1 is a process flow diagram illustrating an example process of some implementations of the current subject matter that can provide for the determining of personalized media and targeted gaming applications;

DETAILED DESCRIPTION

Figure 2:
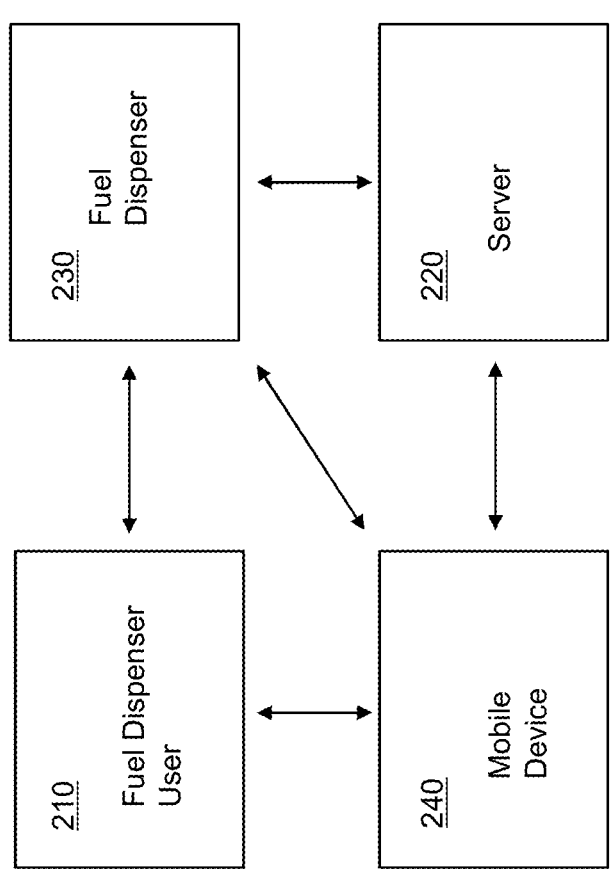
FIG. 2 is a system diagram illustrating an example system of some implementations of the current subject matter that can provide for the determining of personalized media and targeted gaming applications.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, a system for determining personalized media and targeted gaming applications, and methods thereof, are provided. A system incorporating the current subject matter can include a fuel dispenser having an interactive display and at least one processor in operable communication with the interactive display that can be configured to determine a gaming application for presentation on the interactive display of the fuel dispenser to a fuel dispenser user while the user is engaged in a fueling transaction at the fuel dispenser, and to determine a personalized communication, for presentation on the interactive display at the conclusion of the fueling transaction, that is based on an interaction of the fuel dispenser user with an instance of the gaming application that is presented on the interactive display of the fuel dispenser during the fueling transaction. The at least one processor can be configured to receive first data characterizing an attribute of the user of the fuel dispenser and to determine the gaming application based on the received first data and by using a first predictive model that predicts an association of the gaming application with the user of the fuel dispenser that is characterized by the first data. The at least one processor can be configured to determine the personalized communication based on the received first data. Such a system can allow for improved electronic media, presented by a fuel dispenser, that is more uniquely tailored to a user of the fuel dispenser, and, by determining the gaming application based on the attributes of the fuel dispenser user, such a system can enable a more personalized and improved user experience to be enjoyed by the fuel dispenser user at a fueling station.

FIG. 1 is a process flow diagram illustrating an example process 100 of some implementations of the current subject matter that can provide for the determination of personalized media and targeted gaming applications, and FIG. 2 is a system diagram illustrating an example system 200 that incorporates some implementations of the current subject matter and that can provide for the same. As shown in FIG. 2, the system 200 includes a fuel dispenser 230 configured to dispense fuel and having at least one data processor configured to perform one or more aspects of the functionality described herein; a fueling station in operable communication with the fuel dispenser 230 that is configured to manage the dispensation of fuel from the fuel dispenser 230 and the purchase of fueling station items that are unrelated to the purchase of fuel; a server 220 in operable communication with the fueling station controller; and a mobile device 240 in operable communication with the fuel dispenser 230 and the server 220 and including an application configured to provide one or more aspects of the functionality described herein.

Referring to both FIGS. 1 and 2, at 110, first data characterizing an attribute of a fuel dispenser user 210 can be received by at least one data processor of a server 220 that is in operable communication with a fuel dispenser 230. In some implementations, the attribute of the fuel dispenser user 210 that is characterized by the first data can include one or more of: an identity of the fuel dispenser user 210, a demographic of the fuel dispenser user 210, a location of the fuel dispenser 230, a date and time during which the fuel dispenser user 210 is interacting with the fuel dispenser 230, weather conditions at the fuel dispenser 230 during a fueling transaction, fueling preferences of the fuel dispenser user 210, and a history of purchases at a fueling station made by the fuel dispenser user 210.

In some implementations, the first data can be received by the server 220 from the fuel dispenser 230, and the fuel dispenser 230 can generate the first data based on data characterizing the fuel dispenser user 210 that is acquired by one or more components of the fuel dispenser 230 and characterizes the attribute of the fuel dispenser user 210. For example, in some implementations, the fuel dispenser 230 can include a card reader that is configured to acquire identity information characterizing the fuel dispenser user 210 and encoded on a card (e.g., loyalty card, credit card, and the like), and the fuel dispenser 230 can determine the identity of the fuel dispenser user 210 from the acquired identity information and include the determined identity of the fuel dispenser user 210 in the first data. For example, in some implementations, the fuel dispenser 230 can include an image sensor, such as a camera, that is configured to acquire an image of the fuel dispenser user 210 and/or the vehicle of the fuel dispenser user 210, and the fuel dispenser 230 can determine the identity of the fuel dispenser user 210 from the acquired image using image recognition techniques (e.g., facial recognition, vehicle license plate number detection, and the like). For example, in some implementations, the acquired image of the fuel dispenser user 210 can be analyzed by the fuel dispenser 230 to determine the demographic of the fuel dispenser user 210 (e.g., age, weight, height, disability status, and the like), and the fuel dispenser 230 can include the determined demographic in the first data. For example, in some implementations, the fuel dispenser 230 can determine the date and time during which the fuel dispenser user is interacting with the fuel dispenser 230 and include the determined date and time in the first data. For example, in some implementations, the fuel dispenser 230 can include ambient sensors configured to acquire ambient temperature, humidity, and/or barometric pressure at the fuel dispenser 230, and the fuel dispenser 230 can determine weather conditions at the fuel dispenser 230 during a fueling transaction from the acquired ambient data and include the determined weather conditions in the first data. For example, in some implementations, the fuel dispenser 230 can determine fueling preferences of the fuel dispenser user 210 and include the determined fueling preferences in the first data. For example, in some implementations, the fuel dispenser 230 can acquire prior transactional data associated with the fuel dispenser user 210, determine a history of purchases at a fueling station made by the fuel dispenser user 210 from the acquired transactional data, and include the determined history of purchases in the first data. In some implementations, one or more components of the above-described data used in determining the above-described attributes can be acquired by, or transmitted to, the server 220, and one or more of the analyses/determinations made to obtain the above-described attributes can be performed by the server 220 based on the acquired/received data.

At 120, second data characterizing a gaming application, for presentation on the interactive display of the fuel dispenser 230, can be determined based on the received first data. In some implementations, the second data can be determined by the server 220 based on the first data received from the fuel dispenser 230 and/or other electronic sources/databases in operable communication with the server 220. In some implementations, the gaming application can include any kind of electronic game that a fuel dispenser user 210 can play for purposes of achieving a gaming outcome (e.g., a win or a loss). The gaming application can be determined from a variety of gaming types, such as social media based games, in which the fuel dispenser user 210 can simultaneously or non-simultaneously compete against many other players of the game, one-player competitive games (e.g., board games against a computerized opponent), and the like. The gaming application can be structured such that the fuel dispenser user 210, when interacting with an instance of the gaming application, can achieve a winning or losing outcome of the game embodied by the instance. The gaming application can include a "free" game, in which no money is required to play the game of the gaming application. In some implementations, the gaming application can include a "paid" game, in which the fuel dispenser user 210 must pay money to play the game of the gaming application.

In some implementations, the second data can be determined using a first predictive model, which can predict an association of the gaming application with the fuel dispenser user 210 that is characterized by the first data. For example, in some implementations, the first predictive model can analyze the attribute of the fuel dispenser user 210 that is characterized by the received first data and determine whether the attribute is substantially correlated with a model attribute present in the first predictive model that is associated with the gaming application. As such, the first predictive model can predict that there is a high likelihood that the fuel dispenser user 210 is associated with the gaming application and determine second data characterizing the gaming application. In some embodiments, the association of a model attribute with a gaming application that is included in the first predictive model can indicate that a person having the model attribute is highly likely to be interested in the gaming application and therefore has a high affinity for the gaming application. In some implementations, the first predictive model can be trained based on empirically-determined user attributes that are determined to be significant for a user's affinity for a gaming application. For example, a user's presence on social media platforms may be a significant attribute that can predict the user's affinity toward social media based games, and a user's absence from social media platform may be a significant attribute that can predict the user's affinity toward board games against a computerized opponent. As a result, the first predictive model can enable the providing of gaming applications and/or suggestions for gaming applications that are more closely tailored to the interests of the fuel dispenser user 210 in a more computationally efficient and effective manner than would otherwise be possible using conventional techniques of determining gaming applications and/or suggestions for gaming applications to provide to the fuel dispenser user 210. Conventional techniques are often not capable of determining gaming applications and/or suggestions for gaming applications that are optimized for a user due to their inability to incorporate context-aware decision making algorithms and historical data characterizing one or more attributes of the user in the determination of the gaming application and/or a suggestion for a gaming application.

At 130, the second data can be provided such that an instance of the gaming application is presented on an interactive display of the fuel dispenser 230. In some implementations, the determined second data can include application data required to execute the gaming application on the fuel dispenser 230, and the application data can be provided to the fuel dispenser 230 such that an instance of the gaming application characterized by the application data is presented on the interactive display of the fuel dispenser 230. In some implementations, the second data can include data characterizing a name of the gaming application and can cause the graphical presentation of the name of the gaming application on a selectable icon on the interactive display of the fuel dispenser 230, which, when selected by the fuel dispenser user 210, can cause the execution of the gaming application on the fuel dispenser 230 and the presentation of an instance of the selected gaming application on an interactive display to the fuel dispenser user 210. In some implementations, the second data can include data characterizing a list of gaming applications and, when provided to the fuel dispenser 230, the fuel dispenser 230 can cause the presentation of the list of gaming applications in a graphical user interface displayed on the interactive display of the fuel dispenser 230. The fuel dispenser user 210 can select the gaming application of interest for execution on the fuel dispenser 230, and the fuel dispenser 230 can present an instance of the selected gaming application on the interactive display to the fuel dispenser user 210. In some implementations, the fuel dispenser user 210 can play the game in the instance of the gaming application while conducting a fueling transaction at the fuel dispenser 230.

In some implementations, similar to the functionality described above, the second data can be provided to a mobile device 240 of the fuel dispenser user 210 having a graphical user interface displayed on a screen of the mobile device 240 and with which the fuel dispenser user 210 can interact. Similar to the functionality described above, in some implementations, the determined second data can include application data required to execute the gaming application on the mobile device 240, and the application data can be provided to the mobile device 240 such that an instance of the gaming application characterized by the application data is presented on the screen of the mobile device 240. In some implementations, the second data can include data characterizing a name of the gaming application and can cause the graphical presentation of the name of the gaming application on a selectable icon on the screen of the mobile device 240, which, when selected by the fuel dispenser user 210, can cause the execution of the gaming application on the mobile device 240 and the presentation of an instance of the selected gaming application on the screen of the mobile device 240 to the fuel dispenser user 210. In some implementations, the second data can include data characterizing a list of gaming applications and, when provided to the mobile device 240, the mobile device 240 can cause the presentation of the list of gaming applications in a graphical user interface displayed on the screen of the mobile device 240. The fuel dispenser user 210 can select the gaming application of interest for execution on the mobile device 240, and the mobile device 240 can present an instance of the selected gaming application on the interactive display to the fuel dispenser user 210. If the gaming application is not installed on the mobile device 240, the selection can cause the gaming application to be installed on the mobile device 240 and the execution of the instance of the gaming application to begin. Similar to the functionality described above, the fuel dispenser user 210 can play the game in the instance of the gaming application by interacting with the screen of the mobile device 240 while conducting a fueling transaction at the fuel dispenser 230.

In some implementations, third data characterizing an interaction of the fuel dispenser user 210 with the instance of the gaming application can be received. In some implementations, the interaction can include a round or match of the game characterized by the gaming application that is played by the fuel dispenser user 210 in the instance of the gaming application. In some implementations, the third data can characterize a gaming outcome of the round or match of the game (e.g., a winning outcome, a losing outcome, a draw, etc.) played by the fuel dispenser user 210 in the instance of the gaming application. In some implementations, the third data can characterize a gaming level of the instance of the gaming application (e.g., the level of the game played by the fuel dispenser user 210 when interacting with the instance). In some implementations, the third data can characterize a game difficulty of the instance of the gaming application (e.g., a degree of difficulty of the gameplay experienced by the fuel dispenser user 210). In some implementations, the third data can characterize whether the game played in the instance of the gaming application is a "free" game or a "paid" game. In some implementations, the third data can characterize whether the fuel dispenser user 210 completed any "challenges" or scored a number of points during the playing of the game in the instance of the gaming application.

In some implementations, the third data can be generated by the fuel dispenser 230 and received by the server 220. In some implementations, the third data can be generated by the fuel dispenser 230 once the game played in the instance of the gaming application (via interaction with the interactive display of the fuel dispenser 230) is complete and the fueling transaction conducted by the fuel dispenser user 210 at the fuel dispenser is complete, and the fuel dispenser 230 can transmit the third data to the server 220. In some implementations, such as when the game is played via interaction with the screen of the mobile device 240, the third data can be generated by the mobile device 240 and received by the server 220.

In some implementations, fourth data characterizing a personalized communication can be determined based on the received first data and the received third data. In some implementations, the fourth data can be determined by the server 220 based on the first data received from the fuel dispenser 230 and/or other electronic sources/databases in operable communication with the server 220. In some implementations, the mobile device 240 can be in operable communication with the server 220, and the fourth data can be determined by the server 220 based on the third data received from the fuel dispenser 230 and/or the mobile device 240.

In some implementations, the personalized communication can include media characterizing a coupon and/or a voucher for a future transaction at the fueling station. In some implementations, the personalized communication can include media characterizing a coupon and/or a voucher for secondary products (e.g., car wash, air compressor, convenience store items, etc.) that are available at the fueling station. In some implementations, the personalized communication can include media characterizing a promotion or offer for a gaming device and/or equipment located at the fueling station. In some implementations, the personalized communication can include media characterizing a discount or coupon to be applied to the cost of the just-completed fueling transaction. In some implementations, the personalized communication can include media characterizing a promotion to download a mobile application version, for playing on the mobile device 240, of the gaming application played on the fuel dispenser 230. In some implementations, the personalized communication can include media characterizing a virtual award of loyalty points that can be added to a loyalty points account of the fuel dispenser user 210 for later redemption at the fuel dispenser 230 and/or at other areas of the fueling station (e.g., car wash, convenience store, air compressor, etc.).

In some implementations, the fourth data can be determined using a second predictive model, which can predict an association of the personalized communication with the fuel dispenser user 210 that is characterized by the first data and with the received third data that characterizes the fuel dispenser user 210's interaction with the instance of the gaming application. For example, in some implementations, the second predictive model can analyze the attribute of the fuel dispenser user 210 that is characterized by the received first data and determine whether the attribute is substantially correlated with a model attribute present in the second predictive model that is associated with the personalized communication. As such, the second predictive model can predict that there is a high likelihood that the fuel dispenser user 210 is associated with the personalized communication. For example, as referenced above, the first data can characterize a history of purchases made by the fuel dispenser user 210, and the second predictive model can analyze the history of purchases to determine fourth data that includes a personalized communication that includes media characterizing an incentive for the fuel dispenser user 210 to purchase a product that is the same as, or similar to, one or more products included in the history of purchases made by the fuel dispenser user 210.

For example, in some implementations, the second predictive model can analyze the third data characterizing the interaction of the fuel dispenser user 210 with the instance of the gaming application and predict an association of the interaction characterized by the third data with the personalized communication. For example, in some implementations, the second predictive model can analyze a feature of the third data and determine whether the feature is substantially correlated with a model feature present in the second predictive model that is associated with the personalized communication. As such, the second predictive model can predict that there is a high likelihood that the fuel dispenser user 210 will be associated with the content of the personalized communication. For example, as referenced above, the third data can characterize the gaming outcome, the gaming level, the game difficulty, and/or a score acquired by the fuel dispenser user 210 when playing the game in the instance of the gaming application during the fueling transaction. If the second predictive model determines, from analyzing the third data, that the fuel dispenser user 210 performed well in interacting with the gaming instance, such as by achieving a winning outcome and/or by scoring a high number of points, the second predictive model can determine whether that criteria is substantially correlated with model high-performance criteria for a particular type of personalized communication (e.g., media characterizing a substantial discount off of the cost of a fueling transaction, a voucher for an expensive item, etc.). If such substantial correlation exists, the second predictive model can predict that the fuel dispenser user 210's interaction with the instance is associated with a personalized communication that characterizes a large incentive for further engagement with the fuel dispenser 230 and/or the other areas of the fueling station, and the fourth data characterizing that communication is determined. As a result, the second predictive model can enable the creation of communications that are more closely tailored to the interests of the fuel dispenser user 210 in a more computationally efficient and effective manner than would otherwise be possible using conventional techniques of creating content for communications to users. Conventional techniques are often not capable of determining content for communications to users that is optimized for a user due to their inability to incorporate context-aware decision making algorithms and historical data characterizing one or more attributes of the user in the determination of the communications content.

In some implementations, the third data can be similarly used by the second predictive model to modify or augment a personalized communication that is initially determined using the first data. For example, if the second predictive model determines, from analyzing the third data, that the fuel dispenser user 210 performed well in interacting with the instance of the gaming application, the second predictive model can revise the initially-determined personalized communication, determined based on the fuel dispenser user 210's purchase history, to include additional incentives based on the correlation between the interaction criteria characterized by the third data and the model high-performance criteria that are associated with those additional incentives.

In some implementations, the fourth data can be provided such that the personalized communication is presented on an interactive display of the fuel dispenser 230. In some implementations, the fourth data includes graphical media that characterizes the personalized communication. In some implementations, the fourth data can be provided such that the personalized communication is presented on the screen of the mobile device 240.

Figure 3:
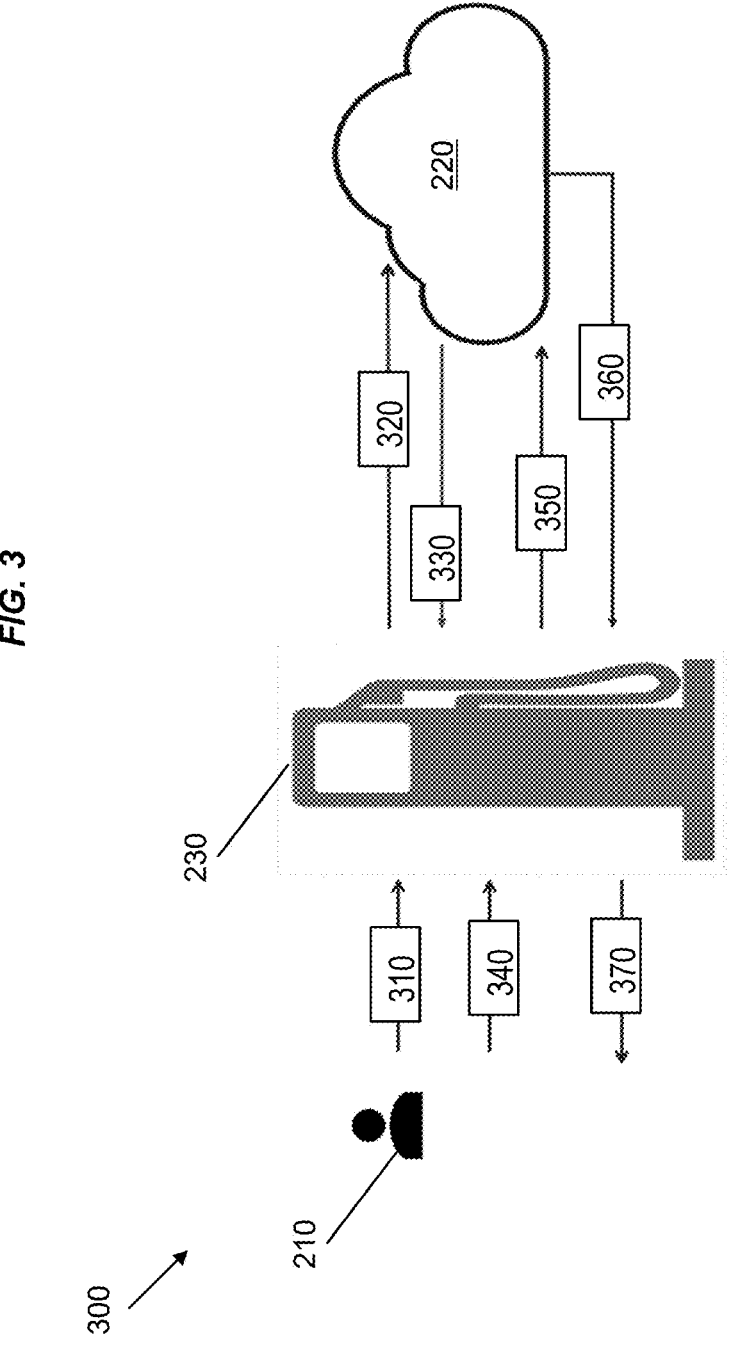
FIG. 3 is a data flow diagram illustrating the transfer of data between one or more of the system components illustrated in FIG. 2.

FIG. 3 is a data flow diagram 300 illustrating the transfer of one or more of the types of data described herein between one or more of the system components illustrated in FIG. 2 and in accordance with some implementations of the current subject matter.

In some implementations, prior to the dispensation of fuel from the fuel dispenser, the fuel dispenser user 210 can, at 310, interact with a fuel dispenser 230 to begin a fueling transaction. During the interaction, as described above, the fuel dispenser 230 can acquire and/or determine various forms of information characterizing the fuel dispenser user 210 and/or attributes of the fuel dispenser user 210, as described above, and the fuel dispenser 230 can determine the first data that characterizes the attributes of the fuel dispenser user 210.

At 320, the fuel dispenser 230 can transmit the first data to the server 220, which can utilize the first predictive model described above to analyze the first data received from the fuel dispenser 230 and determine, from the first data, second data that characterizes the above-described gaming application for presentation on the interactive display of the fuel dispenser 230. For example, as explained above, in some implementations, the second data can characterize a list of gaming applications that are determined using the first predictive model and based on the first data.

At 330, as described above, the server 220 can provide the second data to the fuel dispenser 230 such that an instance of the gaming application is presented on the interactive display of the fuel dispenser 230. For example, in some implementations, when the second data characterizes a list of gaming applications that are determined using the first predictive model and based on the first data, the list of gaming applications characterized by the second data is presented on the interactive display of the fuel dispenser 230, and the fuel dispenser user 210 can select, via interaction with the interactive display, one of the gaming applications for execution on the fuel dispenser 230.

At 340, as described above, the fuel dispenser user 210 can interact with the interactive display of the fuel dispenser 230 while the fueling transaction is in progress to play the game in the instance of the gaming application. Once the fueling transaction is complete and the game is complete, the fuel dispenser 230 can generate third data that characterizes the fuel dispenser user 210's interactions with the instance of the gaming application while playing the game, and, at 350, the fuel dispenser 230 can transmit the third data to the server 220. The server 220 can utilize the second predictive model described above to analyze the third data received from the fuel dispenser 230 and determine, from the first data received at 320 and the third data received at 350, fourth data that characterizes the above-described personalized communication for presentation on the interactive display of the fuel dispenser 230.

At 360, the server 220 can transmit the fourth data to the fuel dispenser 230, and the fuel dispenser 230 can, based on the received fourth data, determine graphical media for presentation (at 370), on the interactive display of the fuel dispenser 230, of the personalized communication.

Although the functionality described above has been discussed herein with respect to a fuel dispenser, a fuel dispenser user, and a fueling transaction, this functionality is not limited to use in a fueling environment. For example, the systems, methods, and functionality described herein are equally applicable to electricity dispensing environments, electricity dispensing transactions, electricity dispensers, and electricity dispenser users.

Figure 4B:
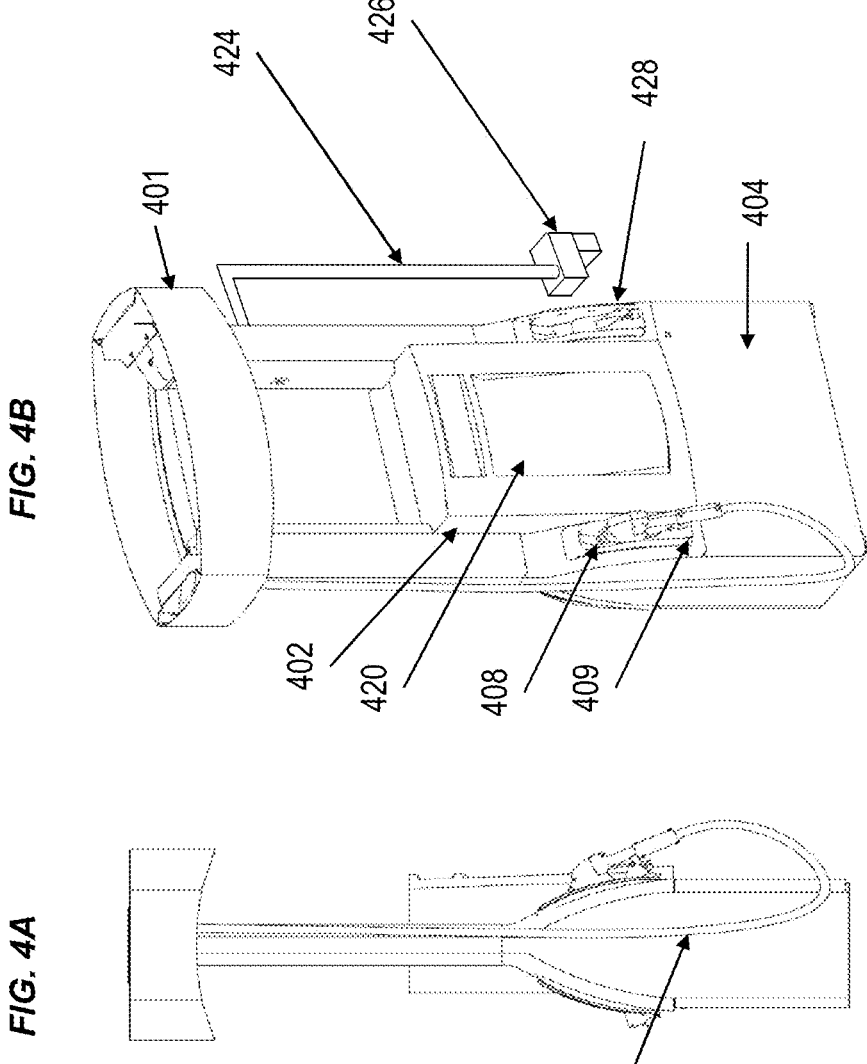
FIG. 4B is a front perspective view of the fuel dispenser shown in FIG. 4A.
Figure 4A:
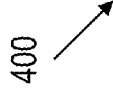
FIG. 4A is a side perspective view of one embodiment of a fuel dispenser.
Figure 5:
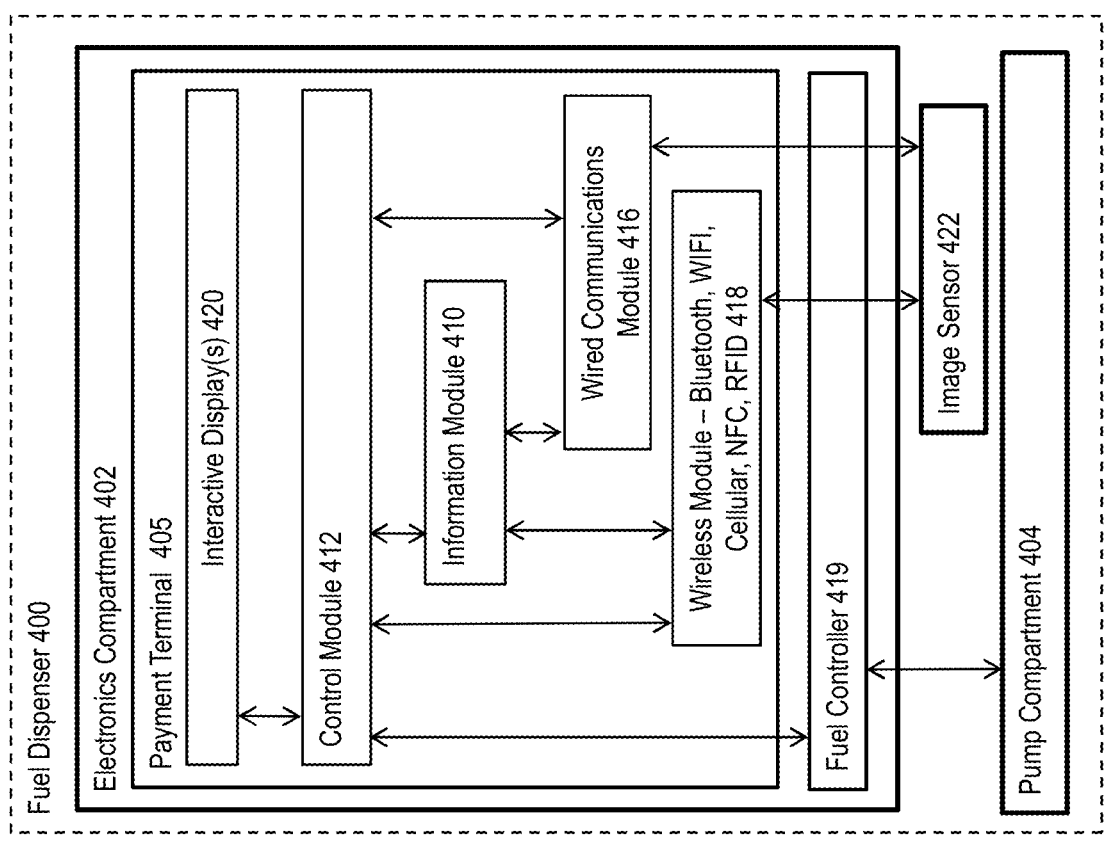
FIG. 5 is a diagram showing internal components of the fuel dispenser of FIGS. 4A and 4B.

FIGS. 4A and 4B illustrate one embodiment of a fuel dispenser 400 that can be used in some implementations of the current subject matter, and FIG. 5 illustrates components of the fuel dispenser. In general, the dispenser 400 includes a dispenser body 401 having an electronics compartment 402, a pump compartment 404, and an image sensor 422. The pump compartment 404 houses a pump configured to pump fuel from a fuel tank or other reservoir, as well as one or more meters that can be configured to monitor fuel flow, flow of fuel additives, and/or flow of other components of the fuel. The pump compartment 404 can also include other components to facilitate fuel dispensing and mixing, such as motors and valves, a strainer/filtering system, a vapor recovery system, and the like. The pump compartment 404 is isolated from the electronics compartment 402 within the dispenser 400 to facilitate safety, security, and/or maintenance, as will be appreciated by a person skilled in the art. Fuel is thus not allowed to flow from the pump compartment 404 to the electronics compartment 402 and instead flows from the pump compartment 404 through hose 406 to a nozzle 408 for dispensing. As will be appreciated by a person skilled in the art, the nozzles 408 are each configured to dispense fuel from the dispenser 400 as pumped there-from by the pump. The dispenser 400 also includes a nozzle receptacle 409 configured to store the nozzle 408 when not in use.

In some implementations, the dispenser 400 can be configured to dispense electricity and can include several components for dispensing the electricity. For example, dispenser 400 can include a charging cable 424 coupled to the dispenser body 401 at one end and configured to deliver electricity to a charging connector 426 coupled to an opposite end. The charging connector 426 can be configured to couple to a charging port of a vehicle (not shown) and to deliver the electricity provided by the dispenser 400, via the charging cable 424, to the vehicle when coupled to the charging port. When not in use, the charging connector 426 can be stored in a charger receptacle 428 formed on the dispenser body 401.

The electronics compartment 402 houses electronics for facilitating payment for fuel and for facilitating the dispensing of the fuel. For example, the electronics compartment 402 can include a fuel controller 419 that, at least in some implementations, includes a data processor, memory, and storage forming part of at least one computing system. The fuel controller 419 is configured to control dispensing of the fuel from the pump compartment 304. The electronics compartment 402 also includes a payment terminal 405 that is configured to provide a user with one or more options to create a desired fuel mixture, receive instructions characterizing the desired fuel mixture, receive payment information and/or user identification information from a user, transmit and receive the payment information and/or the user identification information with a POS system via a forecourt controller (not shown), and deliver fueling instructions to the fuel controller 419 to dispense fuel. The payment terminal 405 can also be configured to provide a user with information related to a status of fueling. For example, the payment terminal can display an amount of fuel that has been dispensed, and a corresponding fuel cost as the fuel mixture is dispensed.

The payment terminal 405 can be configured to facilitate communication between a user and the fuel controller 419, and can include an interactive display 320 and an information module 410. The information module 410 can, at least in some implementations include a data processor, memory, and storage, forming part of at least one computing system. The payment terminal 405 can also include one or more wired communication modules 416 and/or wireless communication modules 418 and a control module 412 that, at least in some implementations includes a data processor, memory, and storage, forming part of at least one computing system. The communication modules 416, 418 can function to allow data to be transmitted to and from various components within the payment terminal 405 via wired and/or wireless communication, respectively. For example, the communication modules 416, 418 can be configured to transmit and receive signals that can characterize, e.g., payment information, user identification information, and/or information regarding a desired fuel selection, via wired and/or wireless communications, respectively. The wireless communication module 418 can include, e.g., a transceiver for communicating via Bluetooth protocol, cellular protocol, WI-FI protocol, near field communication (NFC), and/or a radio frequency identification (RFID) protocol. Wired and/or wireless communication via the communication modules 416, 418 can be according to any of a variety of communication protocols, e.g., TCP/IP, etc., as will be appreciated by a person skilled in the art. The communication modules 416, 418 are also in operable communication with the image sensor 422 and are configured to receive image data acquired by the image sensor 422. The communication modules 416, 418 can additionally transmit the received image data for further external processing as described elsewhere herein.

The interactive display 420, which can be, or can include, a touchscreen. The interactive display 420 can be operably coupled to the control module 412 which can be used to control, dynamically rearrange, and/or update a graphical user interface (GUI) rendered on the display 420. The display 420 can be configured to show information (e.g., media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 412 to be processed. Some examples of information that the display 420 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select.

To facilitate payment, the information module 410 can be configured to receive input such as, e.g., user identification information and/or payment information, and deliver the information to the control module 412. For example, the information module 410 can include a barcode and/or QR code scanner, and/or a NFC contactless card reader for receiving payment information and/or user identification information.

In some embodiments, the information module 410 be operably coupled to the image sensor 422 for acquiring images of facial features of the user, barcode and/or QR code information (e.g., to scan a loyalty rewards card), vehicle features (e.g., vehicle make, model, color, etc.), license plate number, non-facial body features, and the like, which can be used as user identification information. As another example, the information module 410 can include a palm reader and or/ fingerprint reader which can scan a palm and/or finger of the user to obtain user identification information. In some embodiments, the user identification information can be associated with a loyalty rewards identifier automatically. Accordingly, in some embodiments, a pre-determined payment method, and user preferences, can be determined based on user identification information.

As shown in FIG. 5, the information module 410 can be operably coupled to the wired communication module 416 and/or the wireless communication module 418. The wired and wireless communication modules 416, 418 can allow the information module 410 to send and receive payment information and/or user identification information to and from a mobile device such as a smart phone, tablet, laptop, and the like, that is in electronic communication with the information module 410 via the wired and/or wireless communication modules 416, 418. Although the wireless communication module 418 is shown to be located within the payment terminal, the wireless communication module 418 can be located elsewhere on, within, or in the vicinity of, the fuel dispenser 400. For example, the wireless communication module 418 can be mounted on top of the fuel dispenser, which can facilitate retrofitting the wireless communication module 418 to existing fuel dispensers and/or facilitate repair, upgrade, or other maintenance of the communication module 418, as described in U.S. patent application Ser. No. 15/182,201 filed on Jun. 14, 2016 and entitled "Methods and Devices for Fuel Dispenser Electronic Communication."

The subject matter described herein can provide several advantages. By using the functionality and components described above, a fueling station customer can, by conventionally interacting with a fuel dispenser at the fueling station, automatically receive enhanced programming and content at the fuel dispenser and/or at their mobile device that is directly tailored to their interests, resulting in an improved fuel dispenser user experience.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method comprising:

operating both (1) a server including a first data processor and (2) a fuel dispenser being in network communication with the server and being physically remote from the server, the fuel dispenser including a second data processor, an image sensor, and an interactive display with a touch screen;

collecting, by the image sensor of the fuel dispenser, image data of a fuel dispenser user interacting with the fuel dispenser;

determining, by the second data processor of the fuel dispenser and based on the image data, identity information that identifies the fuel dispenser user, the identity information including first data characterizing an attribute of the fuel dispenser user acquired during an interaction by the user with the fuel dispenser;

transmitting, by the fuel dispenser, the first data to the server;

receiving, by the server, the first data from the fuel dispenser;

determining, by a first empirical predictive model configured on the server and using the first data, a correlation between the attribute of the fuel dispenser user and a first empirical predictive model attribute, the correlation indicating an affinity of the fuel dispenser user to play a gaming application on the interactive display during fueling by the user, wherein the first predictive model is trained based on a plurality of attributes corresponding to the user's affinity for the gaming application;

determining, by the first data processor of the server and based on the correlation, second data characterizing the gaming application for presentation on the interactive display during the fueling;

determining, by the first data processor of the server and based on the second data, a graphical icon characterizing the gaming application;

presenting, by the second data processor of the fuel dispenser, the second data and the graphical icon to the fuel dispenser user via display on the interactive display of the fuel dispenser;

generating, by the second data processor of the fuel dispenser, control data indicating that the user has made, via the touch screen of the fuel dispenser, a selection of the graphical icon to execute the gaming application on the interactive display for the user;

executing, by the second data processor of the fuel dispenser and based on the control data, an instance of the gaming application on the interactive display of the fuel dispenser;

receiving, by the first data processor of the server from the fuel dispenser, third data characterizing at least one gaming outcome resulting from the fuel dispenser user playing the gaming application during the fueling;

determining, by a second predictive model configured on the server and using the third data, a second correlation between the attribute of the fuel dispenser user and a second model attribute, the second correlation indicating an interest of the user in engaging with a personalized communication, the second predictive model differing from the first predictive model, and the second model attribute differing from the first model attribute;

determining, by the first data processor of the server and based on the second correlation, fourth data representing the personalized communication;

providing, by the first data processor of the server, the fourth data to the second data processor of the fuel dispenser; and presenting, by the second data processor of the fuel dispenser, the personalized communication to the user after the fueling has concluded.

2. The method of claim 1, further comprising:

providing, by the first data processor of the server, the second data to a third data processor of a mobile device of the fuel dispenser user to present the gaming application on a display of the mobile device; and providing, by the first data processor of the server to the third data processor of the mobile device, the fourth data to present the personalized communication on the display of the mobile device.

3. The method of claim 1, wherein the attribute of the fuel dispenser user characterized by the first data includes one or more of: an identity of the fuel dispenser user, a demographic of the fuel dispenser user, a location of the fuel dispenser, a date and time characterizing the fuel dispenser user's interaction with the fuel dispenser, fueling preferences of the fuel dispenser user, and a history of purchases at a fueling station made by the fuel dispenser user.

4. The method of claim 1, wherein the third data includes one or more of: a gaming level of the instance of the gaming application, and a game difficulty of the instance of the gaming application.

5. The method of claim 1, further comprising determining, using the second predictive model and based on the third data, an incentive, and wherein the personalized communication includes graphical media characterizing the incentive.

6. The method of claim 1, wherein the image data includes one or more of a barcode, a QR code, a facial feature of the fuel dispenser user, a vehicle feature, and a license plate number.

7. The method of claim 1, further comprising analyzing, by the second data processor of the fuel dispenser, the image data using an image recognition technique.

8. The method of claim 1, wherein the first data further includes a fingerprint collected by a fingerprint reader of the fuel dispenser.

9. The method of claim 1, wherein the first data further includes one or more of an ambient temperature value, a humidity value, and a barometric pressure value collected by an ambient sensor of the fuel dispenser.

10. The method of claim 1, further comprising controlling, by the second data processor of the fuel dispenser, an operating state of the fuel dispenser using an input to the interactive display of the fuel dispenser.

11. A system comprising:

a server including a first data processor and memory storing instructions configured to cause the first data processor to perform; and a fuel dispenser in network communication with the server and being physically remote from the server, the fuel dispenser including a second data processor, an image sensor and an interactive display with a touch screen; and the server and the fuel dispenser performing a set of operations comprising:

collecting, by the image sensor of the fuel dispenser, image data of a fuel dispenser user interacting with the fuel dispenser;

determining, by the second data processor of the fuel dispenser and based on the image data, identity information that identifies the fuel dispenser user, the identity information including first data characterizing an attribute of the fuel dispenser user acquired during an interaction by the user with the fuel dispenser;

transmitting, by the fuel dispenser, the first data to the server;

receiving, by the server, the first data from the fuel dispenser;

determining, by a first empirical predictive model configured on the server and using the first data, a correlation between the attribute of the fuel dispenser user and a first empirical predictive model attribute, the correlation indicating an affinity of the fuel dispenser user to play a gaming application on the interactive display during fueling by the user, wherein the first predictive model is trained based on a plurality of attributes corresponding to the user's affinity for the gaming application;

determining, by the first data processor of the server and based on the correlation, second data characterizing the gaming application for presentation on the interactive display during the fueling;

determining, by the first data processor of the server and based on the second data, a graphical icon characterizing the gaming application;

presenting, by the second data processor of the fuel dispenser, the second data and the graphical icon to the fuel dispenser user via display on the interactive display of the fuel dispenser;

generating, by the second data processor of the fuel dispenser, control data indicating that the user has made, via the touch screen of the fuel dispenser, a selection of the graphical icon to execute the gaming application on the interactive display for the user;

executing, by the second data processor of the fuel dispenser and based on the control data, an instance of the gaming application on the interactive display of the fuel dispenser;

receiving, by the first data processor of the server from the fuel dispenser, third data characterizing at least one gaming outcome resulting from the fuel dispenser user playing the gaming application during the fueling;

determining, by a second predictive model configured on the server and using the third data, a second correlation between the attribute of the fuel dispenser user and a second model attribute, the second correlation indicating an interest of the user in engaging with a personalized communication, the second predictive model differing from the first predictive model, and the second model attribute differing from the first model attribute;

determining, by the first data processor of the server and based on the second correlation, fourth data representing the personalized communication;

providing, by the first data processor of the server, the fourth data to the second data processor of the fuel dispenser; and presenting, by the second data processor of the fuel dispenser, the personalized communication to the user after the fueling has concluded.

12. The system of claim 11, the operations further comprising:

providing the second data to a third data processor of a mobile device of the fuel dispenser user to present the gaming application on a display of the mobile device; and providing the fourth data to the third data processor of the mobile device of the fuel dispenser user to present the personalized communication on the display of the mobile device.

13. The system of claim 11, wherein the attribute of the fuel dispenser user characterized by the first data includes one or more of: an identity of the fuel dispenser user, a demographic of the fuel dispenser user, a location of the fuel dispenser, a date and time characterizing the fuel dispenser user's interaction with the fuel dispenser, fueling preferences of the fuel dispenser user, and a history of purchases at a fueling station made by the fuel dispenser user.

14. The system of claim 11, wherein the third data includes one or more of: a gaming level of the instance of the gaming application, and a game difficulty of the instance of the gaming application.

15. The system of claim 11, wherein the operations further comprise determining, using the second predictive model and based on the third data, an incentive, and wherein the personalized communication includes graphical media characterizing the incentive.

16. A non-transitory computer program product storing instructions which, when executed by at least one data processor forming part of at least one computing system, cause the at least one data processor to implement operations comprising:

operating both (1) a server including a first data processor and (2) a fuel dispenser being in network communication with the server and being physically remote from the server, the fuel dispenser including a second data processor, an image sensor, and an interactive display with a touch screen;

collecting, by the image sensor of the fuel dispenser, image data of a fuel dispenser user interacting with the fuel dispenser;

determining, by the second data processor of the fuel dispenser and based on the image data, identity information that identifies the fuel dispenser user, the identity information including first data characterizing an attribute of the fuel dispenser user acquired during an interaction by the user with the fuel dispenser;

transmitting, by the fuel dispenser, the first data to the server;

receiving, by the server, the first data from the fuel dispenser;

determining, by a first empirical predictive model configured on the server and using the first data, a correlation between the attribute of the fuel dispenser user and a first empirical predictive model attribute, the correlation indicating an affinity of the fuel dispenser user to play a gaming application on the interactive display during fueling by the user, wherein the first predictive model is trained based on a plurality of attributes corresponding to the user's affinity for the gaming application;

determining, by the first data processor of the server and based on the correlation, second data characterizing the gaming application for presentation on the interactive display during the fueling;

determining, by the first data processor of the server and based on the second data, a graphical icon characterizing the gaming application;

presenting, by the second data processor of the fuel dispenser, the second data and the graphical icon to the fuel dispenser user via display on the interactive display of the fuel dispenser;

generating, by the second data processor of the fuel dispenser, control data indicating that the user has made, via the touch screen of the fuel dispenser, a selection of the graphical icon to execute the gaming application on the interactive display for the user;

executing, by the second data processor of the fuel dispenser and based on the control data, an instance of the gaming application on the interactive display of the fuel dispenser;

receiving, by the first data processor of the server from the fuel dispenser, third data characterizing at least one gaming outcome resulting from the fuel dispenser user playing the gaming application during the fueling;

determining, by a second predictive model configured on the server and using the third data, a second correlation between the attribute of the fuel dispenser user and a second model attribute, the second correlation indicating an interest of the user in engaging with a personalized communication, the second predictive model differing from the first predictive model, and the second model attribute differing from the first model attribute;

determining, by the first data processor of the server and based on the second correlation, fourth data representing the personalized communication;

providing, by the first data processor of the server, the fourth data to the second data processor of the fuel dispenser; and presenting, by the second data processor of the fuel dispenser, the personalized communication to the user after the fueling has concluded.

* * * * *